United States Patent [19]

Thomas et al.

[11] Patent Number: 4,586,159

[45] Date of Patent: Apr. 29, 1986

[54] DIGITAL BUS ADAPTOR

[75] Inventors: Virgil E. Thomas, Inyokern; Charles R. Jones, Ridgecrest, both of Calif.

[73] Assignee: The United States of America as represented by the Secretary of the Navy, Washington, D.C.

[21] Appl. No.: 553,469

[22] Filed: Nov. 21, 1983

[51] Int. Cl.$^4$ .......................... G06F 5/00; H04L 7/00
[52] U.S. Cl. ..................... 364/900; 375/118; 371/47
[58] Field of Search ... 364/200 MS File, 900 MS File; 371/37, 47; 360/32, 48; 365/219; 375/118; 370/108, 109

[56] References Cited

U.S. PATENT DOCUMENTS

| | | | |
|---|---|---|---|
| 3,876,308 | 4/1975 | Alpers | 356/152 |
| 3,961,368 | 6/1976 | Herbst et al. | 360/48 |
| 4,065,662 | 12/1977 | Garczynski et al. | 364/900 X |
| 4,071,887 | 1/1978 | Daly et al. | 364/200 |
| 4,106,091 | 8/1978 | Hepworth et al. | 364/200 |
| 4,130,883 | 12/1978 | Hazelton | 364/900 |
| 4,207,687 | 6/1980 | Haas et al. | 35/12 R |
| 4,328,580 | 5/1982 | Stockham, Jr. et al. | 360/32 X |
| 4,367,497 | 1/1983 | Jenkins | 360/48 |
| 4,388,698 | 6/1983 | Allen | 364/900 |
| 4,426,685 | 1/1984 | Lorentzen | 364/900 |
| 4,495,574 | 1/1985 | Hofsetetter | 364/200 |
| 4,519,008 | 5/1985 | Takinouchi et al. | 360/32 X |
| 4,525,840 | 6/1985 | Heinz et al. | 371/47 |

*Primary Examiner*—James D. Thomas
*Assistant Examiner*—Thomas Lee
*Attorney, Agent, or Firm*—Robert F. Beers; W. Thom Skeer; Thomas W. Heneen

[57] ABSTRACT

A bus adaptor is a circuit which interconnects incompatible digital systems that are asynchronous to each other, through alteration of bit order arrangement and composition, time frame, speed and shape of signals which involve data signals being superimposed with a clock signal and smoothed and vice versa. The adaptor circuit handles intersystem signals that enter and leave via separate parallel paths of one system and enter and leave via a single bidirectional path of another system.

2 Claims, 8 Drawing Figures

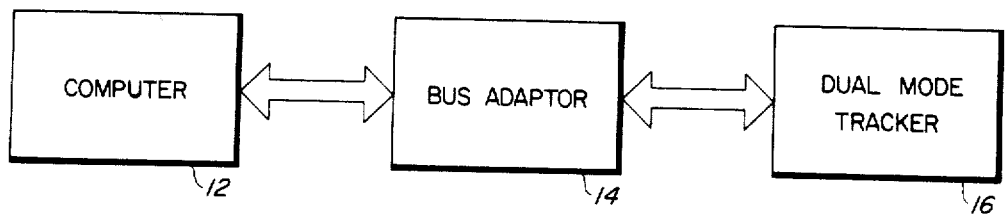
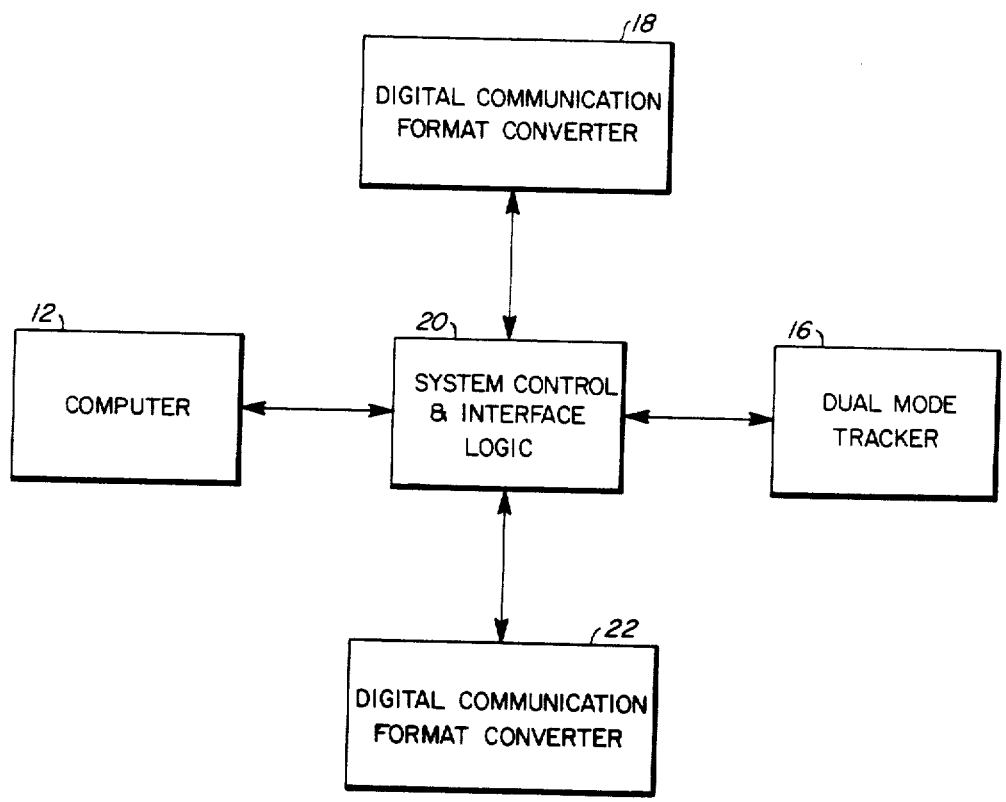

Fig. 5
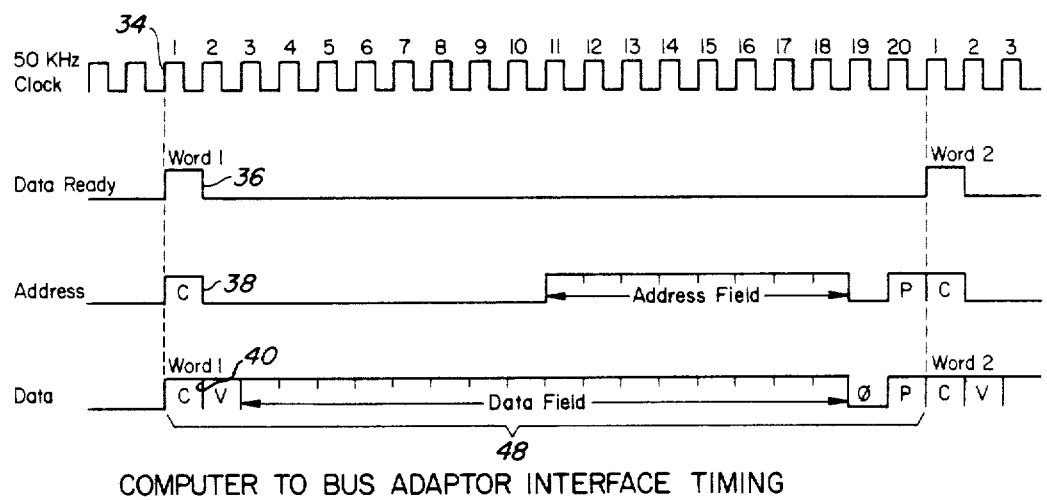
COMPUTER TO BUS ADAPTOR INTERFACE TIMING
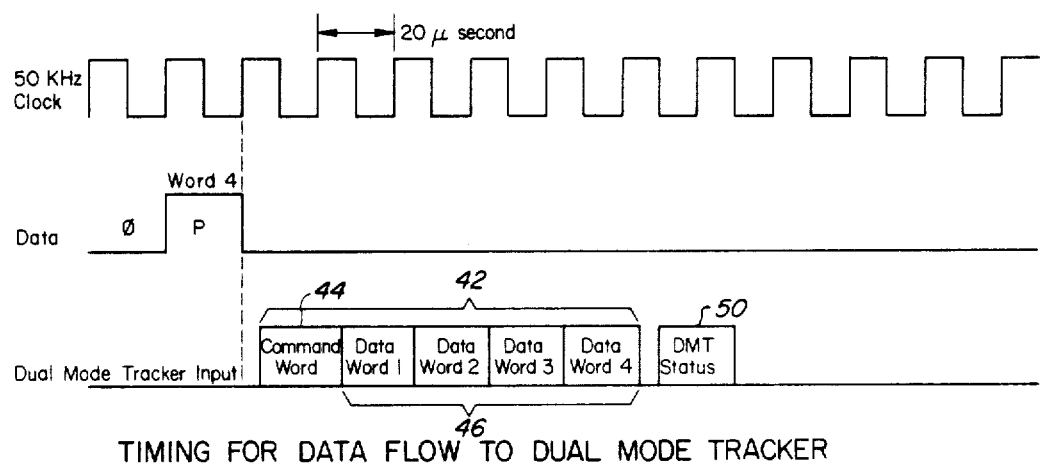
TIMING FOR DATA FLOW TO DUAL MODE TRACKER
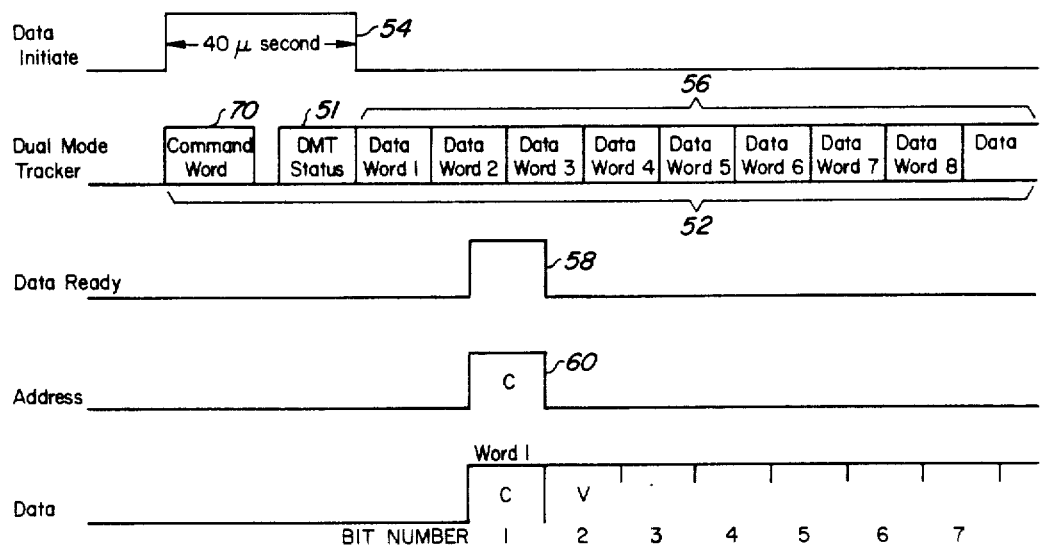
TIMING FOR DATA FLOW FROM DUAL MODE TRACKER TO BUS ADAPTOR

DIGITAL BUS ADAPTOR

BACKGROUND OF THE INVENTION

1. Field of the Invention

This invention relates to digital signal communications systems. More particularly, this invention pertains to digital data transmissions between a computer and another digital system via a bus adaptor.

2. Description of the Prior Art

There are various available digital interface systems, none of which is capable of accomplishing the objective of the subject invention, that is, to provide a means for enabling an airborne computer of one kind of aircraft to communicate with a digitally incompatible dual mode tracker of another kind of aircraft.

Of course, there are some conventional devices which are worthy of some note inasmuch as they at least remotely or indirectly concern subject matter that is pertinent to the circuit constituting the instant bus adaptor. There are common devices which connect digital data from parallel format to serial format, transmit it serially on a minimum of buses, and then convert the data back to parallel format. There are conventional constructions which receive digital data from one device, hold the data for a predetermined time, and then transmit the data to the same or another device. There are devices which multiplex input and output signals so that they effectively can be received and transmitted on the same bus. While these commonly known aforementioned devices appear sufficient for their intended purposes, that is, transmission or interface techniques for handling digital signals, they cannot properly adapt an aircraft computer of one type of airplane to an incompatible dual mode tracker of another type of airplane, as the present invention can.

SUMMARY OF THE INVENTION

The bus adaptor circuit in part utilizes conventional devices in a sophisticated way to achieve its objective. The objective of the bus adaptor is to interface a computer to an incompatible dual mode tracker in an aircraft target acquisition system. The dual mode tracker's signals have a word format, a time base and a manner of combining clock and data information different from and incompatible with the computer.

To achieve a workable interconnection between the computer and the dual mode tracker, the respective signals of each component are changed for compatibility with the other component. An incoming data signal from the computer is converted from a serial to a parallel format. The bits of that signal's words are rearranged and then the signal is converted from a parallel to a serial format. The new signal arrangement is set to a new time frame and encoded with a clock signal. The resulting composite signal is smoothed through filtering as it becomes an outgoing signal via a bidirectional bus to the dual mode tracker.

Signals going from the dual mode tracker compose a smoothed composite signal. The signal is "squared up" into a conventional digital waveform upon its arrival in the bus adaptor. A clock signal is removed from the signal resulting in a remaining data signal which is converted from a serial to a parallel format. The signal is then clocked into a first-in-first-out memory in which the time frame of the signal is changed. The data signal then goes to a multiplexer which rearranges word formats. The parallel signal goes through a parallel-in-serial-out converter. The resulting serial digital signal with the proper data format and different time frame is transmitted to the computer. This two-way digital signal translation continues as long as these types of incompatible systems attached to the bus adaptor communicate with each other.

Further achievements and advantages of the bus adaptor become apparent upon reading its description of the preferred embodiment, attachment of drawings, and statement of claims.

BRIEF DESCRIPTION OF THE DRAWINGS

FIG. 1 is a block diagram showing the interrelationship of the invention to a computer and a dual mode tracker;

FIG. 2 is a block diagram of basic functions within the bus adapter;

FIG. 5 illustrates the signal formats from the computer to the bus adaptor, and from the bus adaptor to the dual mode tracker and vice versa (also illustrated are the respective bit formats for the transmit and receive command words);

DESCRIPTION OF THE PREFERRED EMBODIMENT

Figure 3:
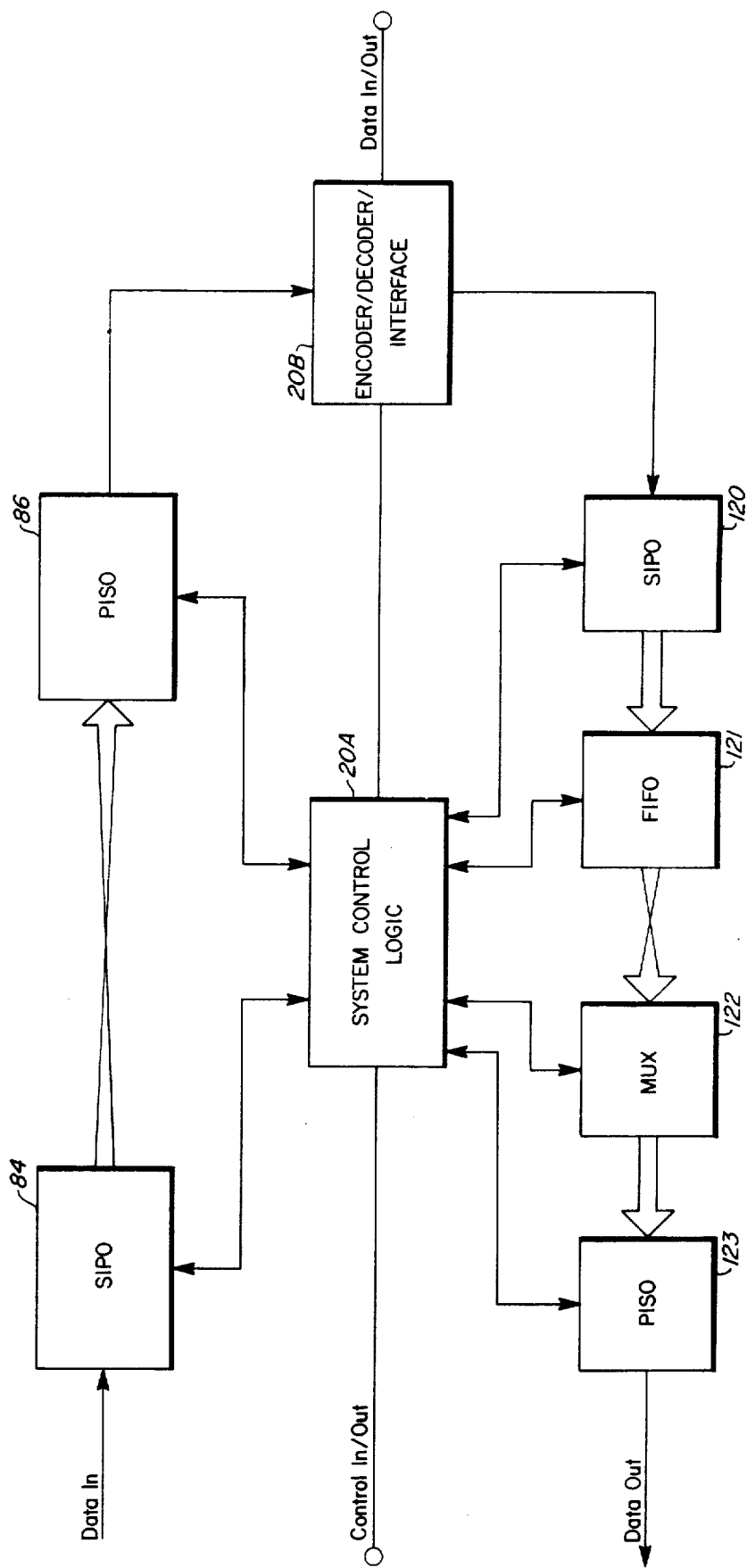
FIG. 3 is a block diagram of basic components in the bus adaptor.

The preferred embodiment of the invention is discussed here in some detail in conjunction with the drawings wherein like parts are designated by like reference numerals, insofar as it is possible and practical to do so.

The block diagram in FIG. 1 shows the overall relationship of the invention to other equipment. FIG. 1 shows a computer 12 interconnected with a bus adaptor 14 which is the invention. Also, FIG. 1 shows a dual mode tracker 16 interconnected with the bus adaptor 14. The dual mode tracker 16 is a military aircraft weapon component for assisting in target acquisition by the aircraft. The computer 12 is an airborne computer which provides information in the form of digital signals to the dual mode tracker 16 enabling the latter to properly perform its function or to be tested. The purpose of the bus adaptor 14 is to allow the airborne computer 12 of one type of aircraft to communicate with the dual mode tracker 16 of another type of aircraft. Other operation or test equipment may be substituted for the airborne computer 12 or the dual mode tracker 16 or both as long as each piece of substituted equipment is respectively replaced by a device which has the same signal characteristics and timing. The bus adaptor 14 between such pairs of equipment allows the latter to communicate to each other despite their having digital signals incompatible for direct intercommunication.

The block diagram in FIG. 2 illustrates the basic functions of the bus adaptor 14. A digital communication format converter 18 in conjunction with a system control and interface logic 20, converts a first signal format in computer 12 to a second signal format for transmission to the dual mode tracker 16. A digital communication format converter 22 in conjunction with the system control and interface logic 20, converts a signal format 56 from the dual mode tracker 16 to a signal format for transmission to the computer 12.

The system control and interface logic 20 comprises functions of timing, coordination, switching, etc. in the bus adaptor 14 which are not performed by the digital communication converters 18 and 22. The system control and interface logic 20 is functionally divisible into system control logic 20A and encoder/decoder/interface 20B as indicated in FIG. 3.

Computer 12 sends a coincidence of signals when data transmission is to commence from computer 12. These signals include logic ones in complementary or differential form to a data in line receiver 25, a data ready in line receiver 27, an address in line receiver 28 and a clock in line receiver 32 in FIG. 4. These signals are shown in FIG. 5 as a clock in signal 34, a data ready in signal 36, an address in signal 38, and a data in signal 40. The data in signal 40 is the beginning of four words of twenty bits each being transmitted to bus adaptor 14 with no temporal space between the words. A data word 48 has its middle sixteen bits designated for actual data.

After bit rearrangement of the data within bus adaptor 14 it becomes part of a data frame 46. The data frame 46 combined with a receive command word 44 makes up a data sequence 42 which is sent to the dual mode tracker 16. The receive command word 44 as indicated in FIG. 5, contains a terminal address (a five bit code designating the dual mode tracker 16 with which communication is desired), a receive bit (indicating that data is to be received by the dual mode tracker 16), a subaddress code (five bits associated with a particular data pack to the dual mode tracker 16), and a word count (five bits indicating the number of words to be received by the terminal). The example receive command word 44 as indicated in FIG. 5 reveals dual mode tracker 16 terminal address number twelve, the receive bit having a zero to designate a receive instruction, the subaddress code designating data pack number one, and word count noting four words in data frame 46 to be received immediately after the receive command word 44.

After the data sequence 42 is sent to the dual mode tracker 16 from the bus adaptor 14, the dual mode tracker 16 responds with a status word 50. The status word 50 contains a terminal address of dual mode tracker 16, a message error bit (indicating valid receipt of data by dual mode tracker 16), and spare bits.

To receive data or information from the dual mode tracker 16, sequence 52 occurs wherein the computer 12 issues a data initiate signal 54 noted in FIG. 5 to the bus adaptor 14 which in turn sends a transmit command word 70 to the dual mode tracker 16. The transmit command word 70 has the same format as the receive command word 44. The sample transmit command word 70 indicates in the first five bits a dual mode tracker 16 terminal address denoting number twelve, a transmit bit having a one to designate a transmit instruction, a subaddress code designating data pack number two, and a word count calling for twelve words in a data frame 56 to be transmitted. Upon receipt of the transmit command word, the dual mode tracker 16 initially transmits a status word 51 followed immediately by the data frame 56 of twelve words to the bus adaptor 14. After bit reshuffling and a time frame change, the data is sent to computer 12. Signals 58 and 60 are Data Ready and Address signals, respectively.

The operation of the bus adaptor 14 is described below more in terms of hardware. The bus adaptor 14 accepts the data words 48 which comprise the data in signal 40 into line receiver 25. The data words 48 are fed serially by line receiver 25 to an AND gate 80, a parity flip-flop (F/F) 82 and a serial-in-parallel-out data shift register (SIPO) 84. The data words 48 are converted to a parallel format by the shift register 84 which may comprise a plurality of 74LS164 integrated circuits to make up its 80 bit capacity. These 74LS164 integrated circuits are available from vendors such as Texas Instruments, Fairchild, etc. These integrated circuits are a standard type of various TTL families which are technically described in data books published by Texas Instruments, Fairchild and the like. An example is the *TTL Data Book*, with a 1978 copyright, published by Fairchild Camera and Instrument Corporation. Other types of integrated circuits as those mentioned in this description are likewise standard configurations available from such integrated circuit vendors and technically described in published data books from such vendors as noted above.

Data, in parallel format, are fed by shift register 84 into a parallel-in-serial-out shift register (PISO) 86 via a path 88. The path 88 consists of sixty-four data bit lines between shift register 84 and shift register 86 which are interconnected so that the bit orders of four data words 48 of FIG. 5 are rearranged to form four data words 46. Shift register 86 may be made up of a plurality of 74L165 type integrated circuits for its 80 bit capacity. The four data words 46 are shifted serially out of register 86 into an encoder/decoder 90 upon receipt of a requisite 16 bit command word from a command PROM 168. The encoder/decoder 90 may be a DI-15530-9 type integrated circuit available from Harris, Inc. The technical data for the DI-15530-9 integrated circuit is available in the *Harris Bipolar and CMOS Digital Data Book* copyrighted in 1981 and published by Harris, Inc.

Figure 4:
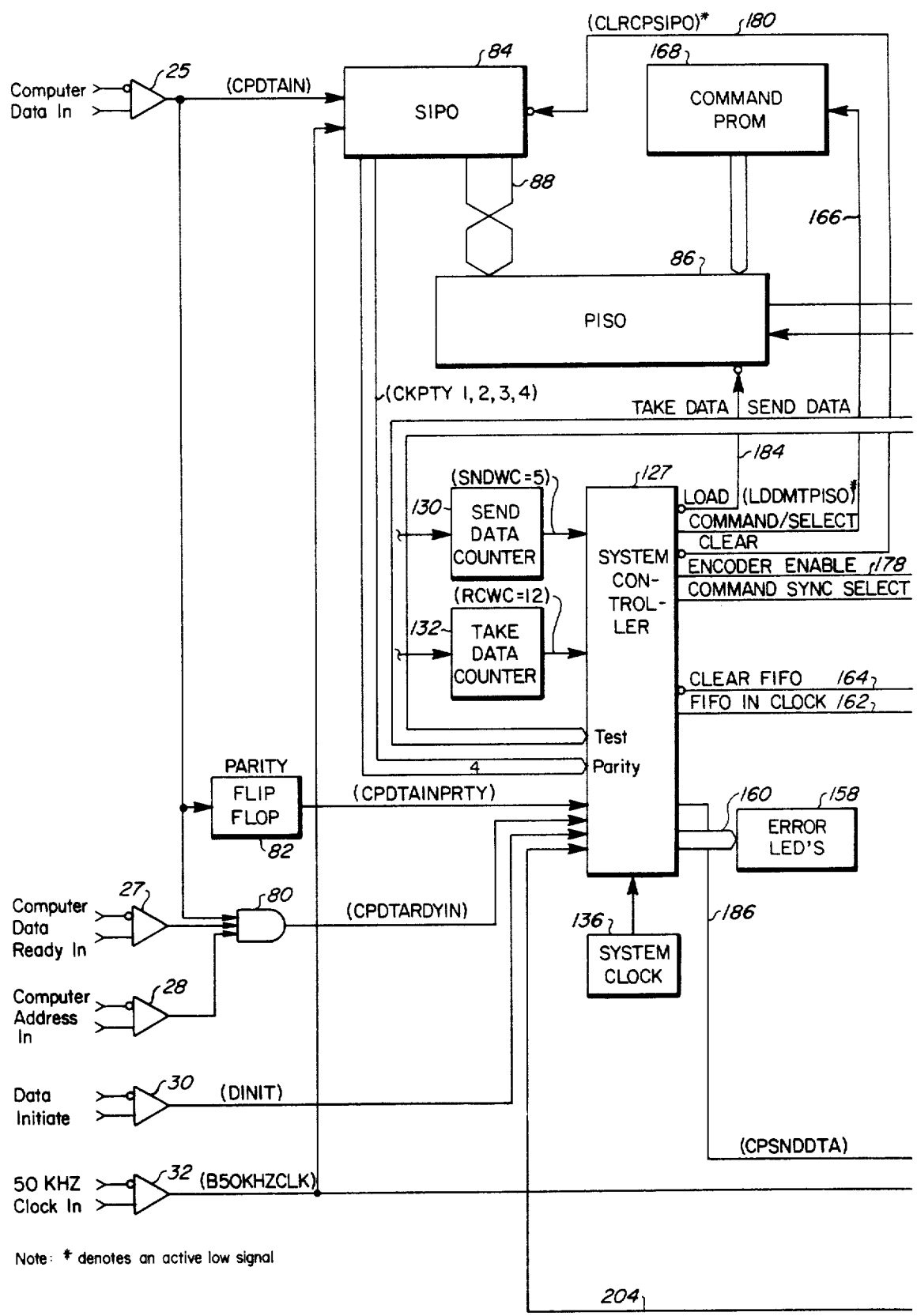
FIG. 4 is a detailed block diagram of the bus adaptor.
Figure 4:
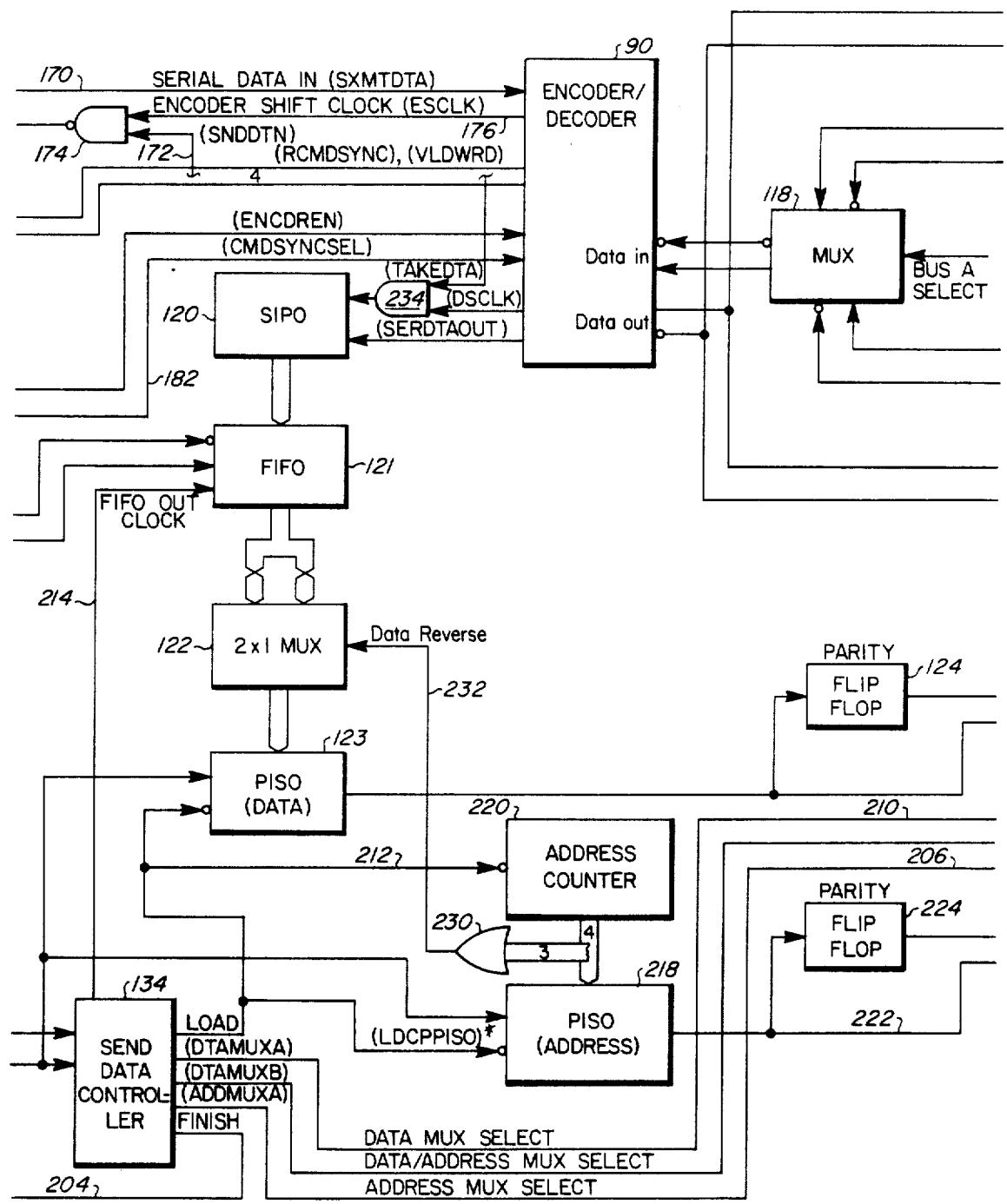
Figure 4:
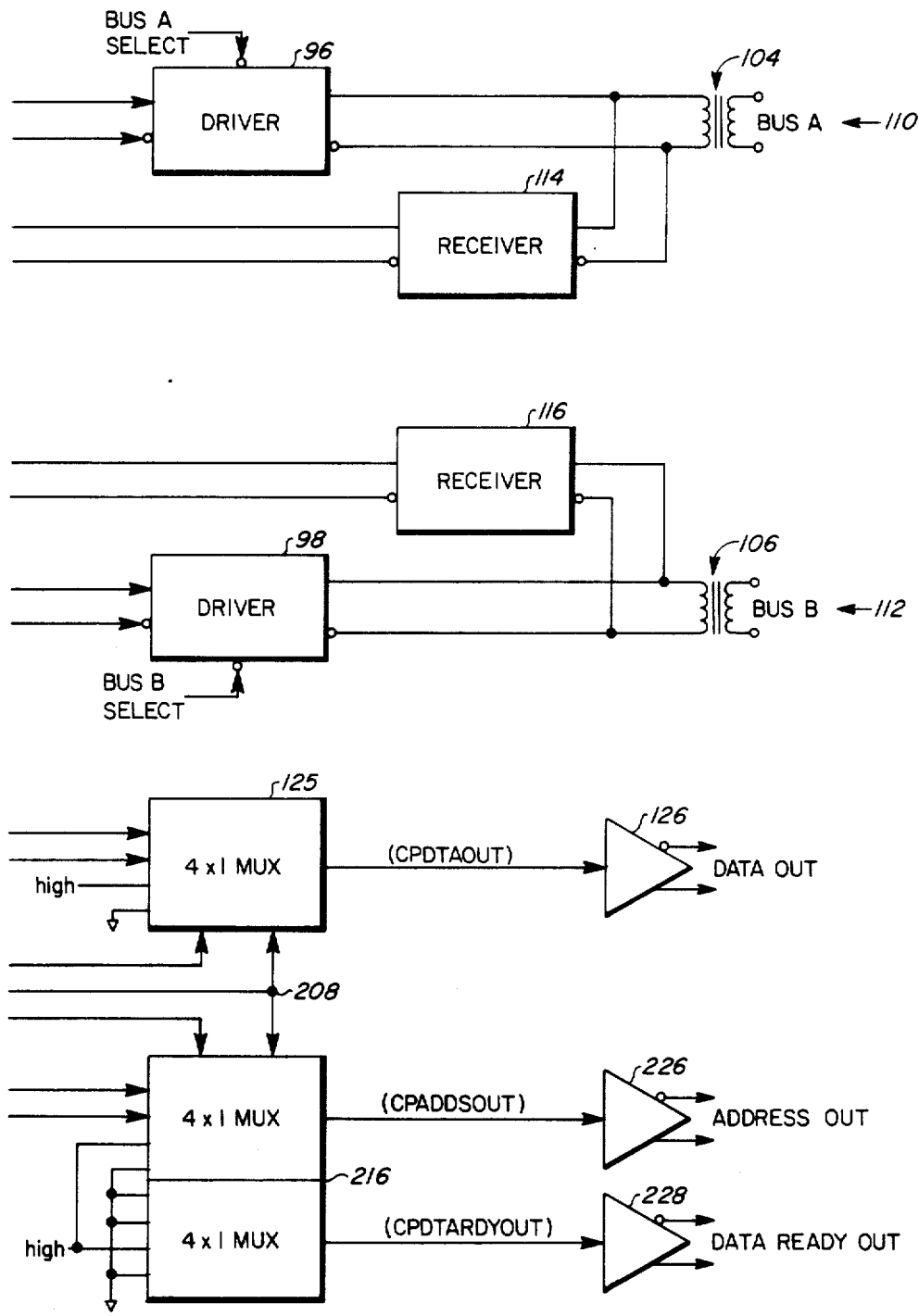
Figure 6:
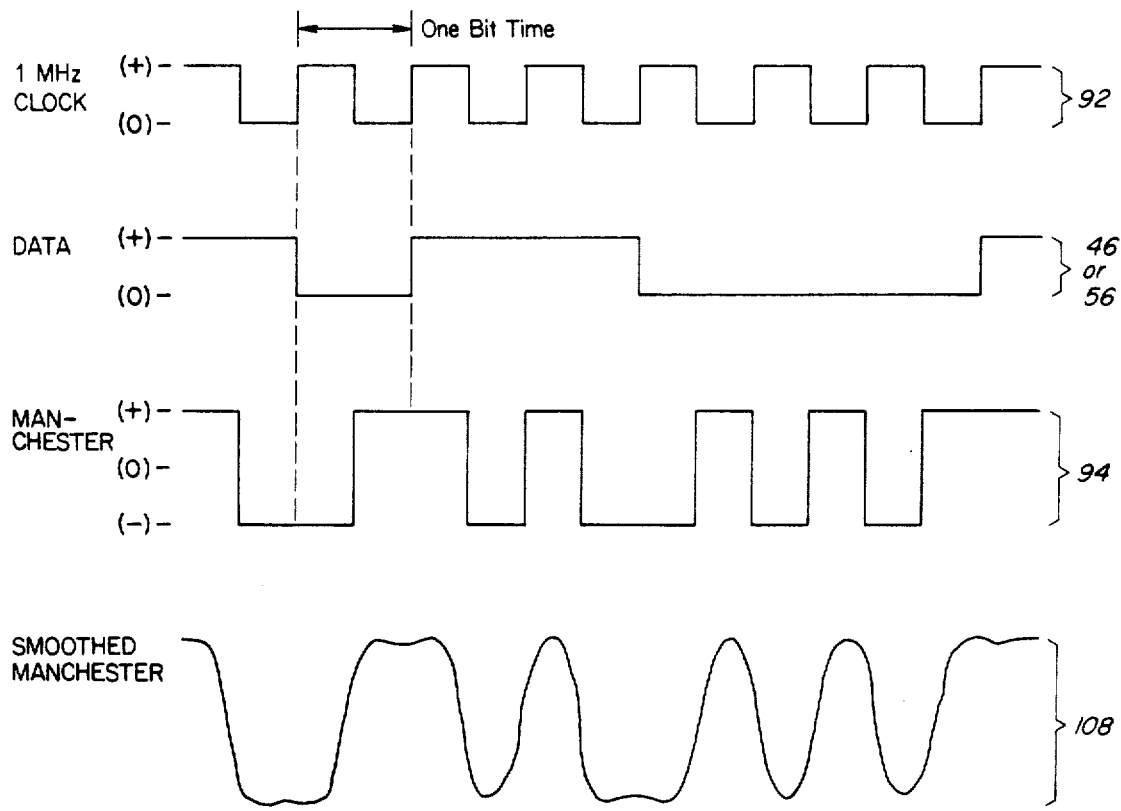
FIG. 6 shows various waveforms in a data signal encoding and decoding of a clock signal with respect to a Manchester waveform.

The data words 46 are encoded with a one megahertz clock signal 92 resulting in a Manchester type waveform 94, as illustrated in FIG. 6, exiting the encoder/decoder 90 of FIG. 4. The Manchester waveform 94 is fed into a first line driver 96 and into a second line driver 98 simultaneously. However, only one driver is enabled at any given time. The line driver, 96 or 98, may be a 2077 type circuit available from CTI, Incorporated. The Manchester waveform 94 is smoothed by the respective driver, 96 or 98. A resulting smoothed Manchester waveform 108, as noted in FIG. 6, is effectively fed out of the respective driver, 96 or 98, into a winding of a corresponding transformer, 104 or 106. The smoothing of the Manchester waveform 108 by driver 96 or 98 reduces the extraneous radiation of harmonic frequencies above one megahertz, as the waveform 108 containing data passes down a bus, 110 or 112, after leaving the other winding of the respective transformer, 104 or 106, to the dual mode tracker 16.

Some of the above-described devices can handle signals in reverse. When computer 12 issues a data initiate signal 54 noted in FIG. 5 to bus adaptor 14 which in turn sends a transmit command word 70 to the dual mode tracker 16, signals are returned by the tracker 16. Such signals comprise data words 56 of FIG. 6 encoded with a clock signal 92 which are in the form of a smoothed Manchester waveform 108. The Manchester waveform 108 comes into the bus adaptor 14 from the dual mode tracker 16 via at least one of two buses, 110 and 112 in FIG. 4, with a winding of a respective transformer, 104 or 106. The waveform 108 goes from the other winding of the respective transformer, 104 or 106, into a corresponding line receiver, 114 or 116. The line receiver, 114 or 116, may be a 3078 type circuit available from CTI, Incorporated. Waveform 108 loses its smoothed character and becomes an unsmoothed Manchester waveform 94 when it leaves either line receiver, 114 or 116, to go into a multiplexer (MUX) 118. The multiplexer may be a 74LS157 type integrated circuit. The multiplexer 118 selects the waveform 94 from either the output of line receiver 114 or the output of line receiver 116 to be fed into the encoder/decoder 90. The encoder/decoder 90 removes the one megahertz clock signal 92 component from waveform 94 which results in a serial data frame 56 in FIG. 5 and FIG. 6.

A take data signal from the encoder/decoder 90 goes to an AND gate 234 which allows a one megahertz clock signal from the encoder/decoder 90 to go through AND gate 234 to a serial-in-parallel-out shift register (SIPO) 120. As a result of the one megahertz clock signal to register 120, the data frame 56 is serially clocked into register 120. After the bits of the words of data frame 56 are put into a parallel format, the data words are clocked into a first-in-first-out memory (FIFO) 121.

The serial-in-parallel-out data shift register 120 is designed for sixteen bit words and may utilize 74LS164 type integrated circuits. The first-in-first-out memory 121 is designed to hold sixteen bit words to a depth of sixteen words. The memory 121 may utilize 74S225 type integrated circuits. The purpose of the first-in-first-out memory 121 is to accommodate the timing difference between the data originating with the dual mode tracker 16 and the data entering the computer 12. The data is fed from the first-in-first-out memory 121 into a data multiplexer (MUX) 122 which effectively rearranges bits in some of the data words so that a data format is created compatible for eventual entry into the computer 12. The data from the multiplexer 122, having the bits of data words still in parallel format, goes into a parallel-in-serial-out data shift register (PISO) 123. The data exits the shift register 123 in a complete serial format. The data multiplexer 122 may utilize 74LS157 type integrated circuits. The shift register 123 can be constructed with 74LS165 type integrated circuits.

The serial data signal is fed by the shift register 123 to a parity flip-flop (F/F) 124 and to a multiplexer (MUX) 125. The output of the parity flip-flop 124 is also fed into the multiplexer 125. The multiplexer 125 may comprise a 74LS153 integrated circuit. The multiplexer 125 feeds the data out via a line driver 126 to the computer 12.

Figure 7:
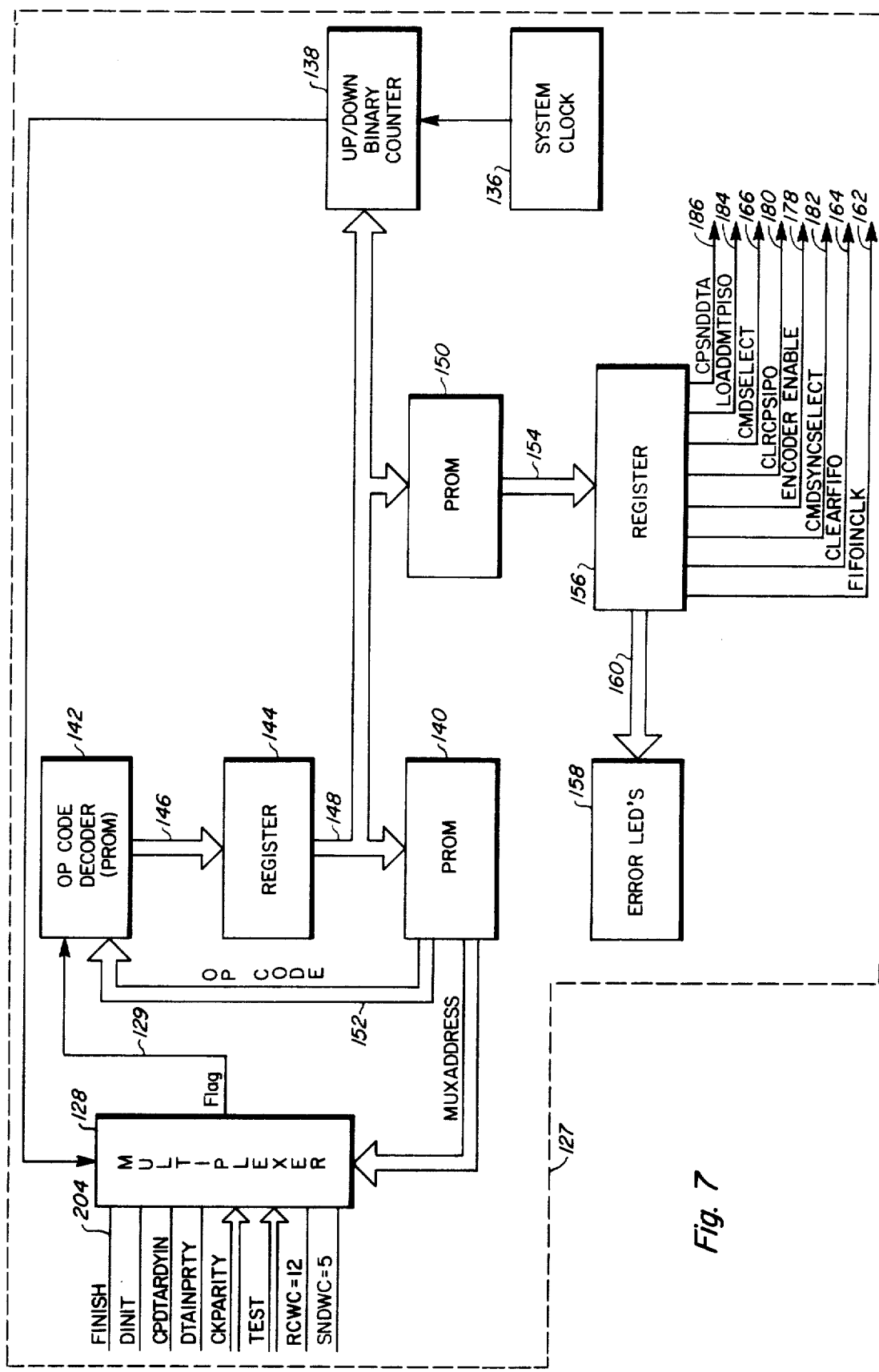
FIG. 7 is a detailed block diagram of a system controller in the bus adaptor.

A system controller 127 coordinates and controls the various signals moving within the bus adaptor 14. Detail of the system controller 127 is presented in FIG. 7. From the serial-in-parallel-out data register 84 of FIG. 4, four check parity signals flow to an input multiplexer (MUX) 128 of FIG. 7. The multiplexer 128 may be a 74150 type integrated circuit. From the encoder/decoder 90 flows at least one test signal to the multiplexer 128. A data in parity signal from flip-flop 82 in FIG. 4 flows into the multiplexer 128 of the system controller 127. A data ready signal flows from the AND gate 80 to the multiplexer 128. A data initiate signal flows from line receiver 30 to multiplexer 128. A send data flag signal, which occurs after five words are sent to the dual mode tracker 16 flows from a send data counter 130 to multiplexer 128. A receive data flag signal, which occurs after twelve words are received from the dual mode tracker 16, flows from a take data counter 132 to multiplexer 128. A finish signal 204 from a send data controller 134 flows to the multiplexer 128. The finish signal 204 is part of a handshake control between the system controller 127 and the send data controller 134. The multiplexer 128 is an effective interface between the system controller 127 and most signals external to it.

One external signal to the system controller 127 which is not directly connected to the multiplexer 128 is a clock signal from a system clock 136 indicated in FIG. 4. From the system clock 136 flows a clock signal to an up/down binary counter 138 in FIG. 7. From the binary counter 138, which may consist of two 74LS191 type integrated circuits, flows a timing signal to the multiplexer 128. The multiplexer 128 receives a group of at least four address signals from a microinstruction programmable read-only memory (PROM) 140 which can be a TBP18L22 type integrated circuit which is available from Texas Instruments, Inc., or like companies. The group of at least four address signals cause the multiplexer 128 to select one of the input signals, other than the clock to be the output flag signal 129 of the multiplexer 128. The selected flag signal 129 effectively flows from the multiplexer 128 to an op code decoder PROM 142 which is a 7603 type integrated circuit available from Harris, Inc. A group of output signals 146 from the PROM 142 flows to a register 144 which consists of at least two 74S482 type integrated circuits. A group of output signals 148 flow from register 144 to the microinstruction PROM 140, to a microinstruction PROM 150, and to the counter 138. A group of at least three op code signals 152 flow from PROM 140 to PROM 142. PROM 150 is a group of at least four TBP18S22 type integrated circuits. In PROM 150 a group of output signals 154 are created as a result of instructing signals 148. The group of output signals 154 are sent to a register 156 which may comprise 74LS273 type integrated circuits. Purposes of register 156 are to hold the signals 154 for dispatch and to insulate them from the effects of signal variation in PROM 150.

From register 156 flows a group of at least five error indication signals 160 to a set of error indicator light-emitting diodes 158. A clock in signal 162 flows from register 156 to the first-in-first-out memory 121 so as to bring in data from the serial-in-parallel-out data register 120. This clock in signal 162 is timed so that it matches a one megahertz data rate of the dual mode tracker 16. A clear signal 164 is fed out of register 156, when appropriate, to clear the first-in-first-out memory 121. A command select signal 166 flows from register 156 to command PROM 168. This signal 166 indicates to the PROM 168 when to send a command word to the parallel-in-serial-out data shift register 86 which in turn sends a signal along the serial data line 170 to the encoder/decoder 90 which in turn lets the dual mode tracker 16 know that data is to be going to the tracker 16 and, also in this sequence of action, the encoder/decoder 90 provides a send data signal 172 to an AND gate 174 which lets a shift clock signal 176 from the encoder/decoder 90 through the AND gate 174 on to the data shift register 86 so the data of that register 86 can be shifted out along line 170 to the encoder/decoder 90. An encoder enable signal 178 flows at an appropriate time from register 156 to the encoder/decoder 90. A clear signal 180 flows from register 156 to the serial-in-parallel-out shift register 84 whenever a need to clear register 84 arises. From register 156 a command sync select signal 182 is fed into the encoder/decoder 90. A load signal 184 is sent from register 156 to the parallel-in-serial-out data shift register 86 when it is ready to receive data from register 84.

Figure 8:
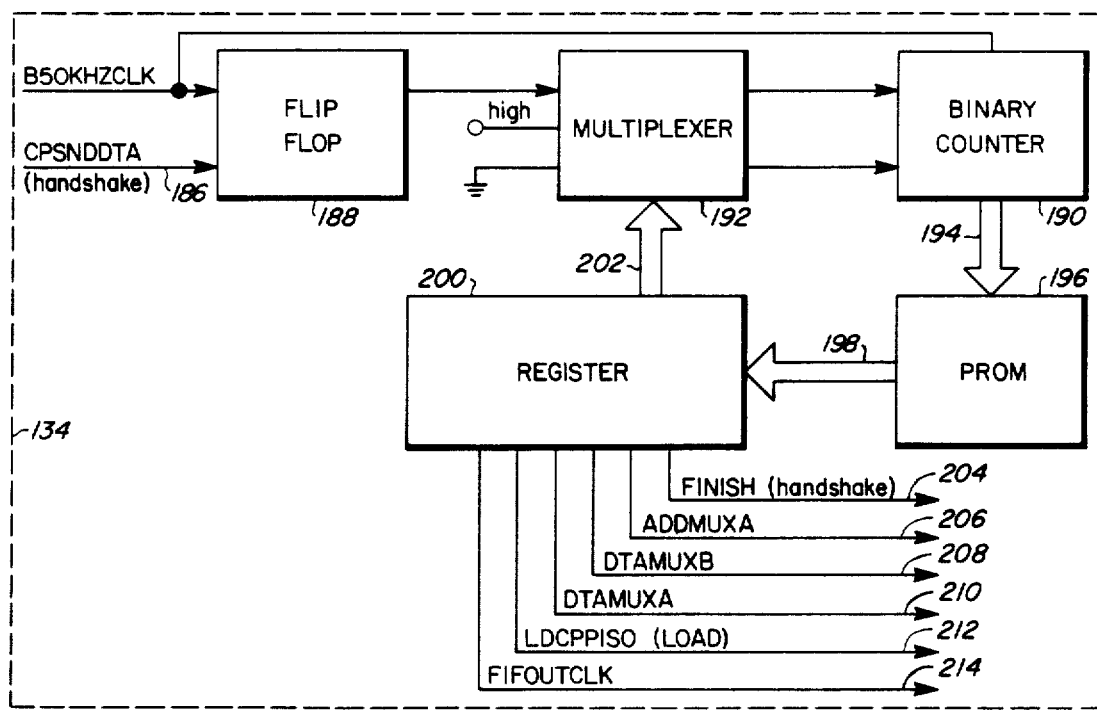
FIG. 8 is a detailed block diagram of a send data controller in the bus adaptor.

A send data signal 186 goes from register 156 to the send data controller 134 which is noted in some detail in FIG. 8. The signal 186, within the send data controller 134, goes to a flip-flop circuit (F/F) 188 which may comprise an LS74 type integrated circuit. A fifty kilohertz clock signal flows from line receiver 32 to flip-flop 188 and to a binary counter 190 in the send data controller 134 as schematized in FIG. 8. The counter 190 may comprise several 74LS161 type integrated circuits. An output of the flip-flop 188 flows into a multiplexer (MUX) 192 which may comprise a 74LS153 type integrated circuit. Also the multiplexer 192 has at least one high input and at least one low input. Two outputs from the multiplexer 192 are effectively connected to two inputs of the binary counter 190. A group of signals 194 flow from the counter 190 to a PROM 196 which may be a 7603 type integrated circuit available from Harris, Inc. A group of signals 198 flow from the PROM 196 to a register 200. The register 200 may be a 74LS273 type integrated circuit. At least one output 202 from register 200 feeds a signal into multiplexer 192. The finish signal 204 of the send data controller 134 flows from register 200 to multiplexer 128 of the system controller 127. The finish signal 204 plus signal 186 make up the handshake control between the system controller 127 and the send data controller 134. An address multiplexer select signal 206 is fed by register 200 to a dual multiplex 216 in FIG. 4. Multiplexer 216 comprises at least two 74LS153 type integrated circuits. A data/address multiplexer signal 208 flows from register 200 to multiplexer 125 and multiplexer 216. A data multiplexer select signal 210 flows from register 200 to multiplexer 125. A load signal 212 is sent, when appropriate, from register 200 to the parallel-in-serial-out data shift register 123, to a parallel-in-serial-out address shift register 218 and an address counter 220. The address shift register 218 may comprise 74LS165 type integrated circuits. From register 200 is a clock out signal 214 sent to clock out data from the first-in-first-out memory 121 to multiplexer 122 in FIG. 4. Also to multiplexer 122 flows a data reverse signal 232 from an OR circuit 230. An address counter 220 sends a group of signals to the address register 218 and to the OR circuit 230. The data reverse signal 232 effectively selects which multiplexer circuit in multiplexer 122 that the data from the first-in-first-out memory 121 is to go through before proceeding on to the parallel-in-serial-out data register 123. From the address register 218 an address out signal 222 flows via a parity bit generator flip-flop circuit 224 and, also directly, to multiplexer 216. The address signal 222 when selected flows from multiplexer 216 to a line driver 226. Also from multiplexer 216 flows a data ready out signal to a line driver 228. The signals from line drivers 126, 226 and 228 go to the computer 12.

Appropriate creation and coordination of signals in bus adaptor 14 are effectively determined and provided by computer 12, dual mode tracker 16, and various components of bus adaptor 14. Any needed special creation or coordination of signals not evident in the above description of bus adaptor 14 can easily be developed by any person skilled in the pertinent art in light of said description.

What is claimed is:

1. A bus adaptor digital circuit which comprises:
   a first data serial-in-parallel-out shift register having at least one input and a data output;
   a first parallel-in-serial-out shift register having an input electrically connected to the data output of the first serial-in-parallel-out shift register and having a data output;
   a second parallel-in-serial-out shift register having a data input and a data output;
   a data multiplexer having a data output electrically connected to the data input of the second parallel-in-serial-out shift register and having a data input;
   a first-in-first-out memory having a data output electrically connected to the data input of the multiplexer and having a data input;
   a second serial-in-parallel-out shift register having a data output electrically connected to the data input of the first-in-first-out memory and having a data input;
   an encoder/decoder/interface having a data input electrically connected to the data output of the first parallel-in-serial-out shift register, a data output electrically connected to the data input of the second serial-in-parallel-out shift register, and having a data input/output; and
   a system control logic, including:
   a system controller having first, second, third, fourth and fifth inputs, having a sixth input electrically connected to the first serial-in-parallel-out shift register, having a seventh input electrically connected to the encoder/decoder/interface, having eighth and ninth inputs, having a first output, having second and third outputs electrically connected to the first-in-in-first-out memory, having a fourth and fifth outputs electrically connected to the encoder/decoder/interface, having a sixth output electrically connected to the first serial-in-parallel-out shift register, having a seventh output, having an eighth output electrically connected to the first parallel-in-serial-out shift register, and having a ninth output;
   a send data controller having a first input electrically connected to the ninth output of the system controller, having a second input, having a first output electrically connected to the second input of the system controller, having second, third and fourth outputs, having a fifth output electrically connected to the second parallel-in-serial-out shift register and having a sixth output electrically connected to the first-in-first-out memory;
   an address parallel-in-serial-out shift register having a first input electrically connected to the fifth output of the send data controller, having second and third inputs, and having an output;
   a command PROM having an input electrically connected to the seventh output of the system controller, and having an output electrically connected to the first parallel-in-serial-out shift register;
   an address counter having an input electrically connected to the fifth output of the send data controller, and having an output electrically connected to the third input of the address parallel-in-serial-out shift register;
   an OR gate having an input electrically connected to the output of the address counter, and having an output electrically connected to the data multiplexer;

a first parity flip-flop having an output electrically connected to the fifth input of the system controller and having an input;

a first AND gate having an output electrically connected to the fourth input of the system controller and having first, second and third inputs;

a first line receiver having first and second inputs and having an output electrically connected to the first serial-in-parallel-out shift register, the input of the first parity flip-flop and the first input of the first AND gate;

a second line receiver having first and second inputs and having an output electrically connected to the second input of the first AND gate;

a third line receiver having first and second inputs and having an output electrically connected to the third input of the first AND gate;

a fourth line receiver having first and second inputs and having an output electrically connected to the third input of the system controller;

a fifth line receiver having first and second inputs and having an output electrically connected to the first serial-in-parallel-out shift register, the second input of the second parallel-in-serial-out shift register, the second input of the send data controller and the second input of the address parallel-in-serial-out shift register;

a plurality of light-emitting diodes having an input electrically connected to the first output of the system controller;

a send data counter having an input and having an output electrically connected to the ninth input of the system controller;

a take data counter having an input and having an output electrically connected to the eighth input of the system controller;

a second parity flip-flop having an input electrically connected to the second parallel-in-serial-out shift register and having an output;

a third parity flip-flop shift register having an input connected to the output of the parallel-in-serial-out address shift register, and having an output;

a first output multiplexer having a first input electrically connected to the output of the second parity flip-flop, having a second input electrically connected to the second parallel-in-serial-out shift register, having a third input electrically connected to the fourth output of the send data controller, having a fourth input electrically connected to the third output of the send data controller, and having an output;

a second output multiplexer having a first input electrically connected to the output of the third parity flip-flop, having a second input electrically connected to the output of the parallel-in-serial-out address shift register, having a third input electrically connected to the second output of the send data controller, having a fourth input electrically connected to the third output of the send data controller, and having first and second outputs;

a first line driver having an input electrically connected to the output of the first output multiplexer, and having first and second outputs, and;

a second line driver having an input electrically connected to the first output of the second output multiplexer, and having first and second outputs; and a third line driver having an input electrically connected to the second output of the second output multiplexer, and having first and second outputs.

2. A bus adaptor digital circuit which comprises:

a first data serial-in-parallel-out shift register having at least one input and a data output;

a first parallel-in-serial-out shift register having an input electrically connected to the data output of the first serial-in-parallel-out shift register and having a data output;

a second parallel-in-serial-out shift register having a data input and a data output;

a data multiplexer having a data output electrically connected to the data input of the second parallel-in-serial-out shift register and having a data input;

a first-in-first-out memory having a data output electrically connected to the data input of the multiplexer and having a data input;

a second serial-in-parallel-out shift register having a data output electrically connected to the data input of the first-in-first-out memory and having a data input;

an encoder/decoder/interface having an encoder/decoder having a first input electrically connected to the first parallel-in-serial-out shift register, having a second input electrically connected to the fifth output of the system controller, having a third input electrically connected to the fourth output of the system controller, having fourth and fifth inputs, having a first output electrically connected to the input of the send data counter, to the take data counter and to the seventh input of the system controller, having second and third outputs, having a fourth output electrically connected to the second serial-in-parallel-out shift register, and having fifth and sixth outputs;

a NAND gate having a first input electrically connected to the second output of the encoder/decoder, having a second input electrically connected to the first output of the encoder/decoder, and having an output electrically connected to the first parallel-in-serial-out shift register;

a second AND gate having a first input electrically connected to the first output of the encoder/decoder, having a second input electrically connected to the third output of the encoder/decoder, and having an output electrically connected to the second serial-in-parallel-out shift register;

an input multiplexer having first, second, third, fourth and fifth inputs, having a first output electrically connected to the fourth input of the encoder/decoder, and having a second output electrically connected to the fifth input of the encoder/decoder;

a first bus driver having a first input electrically connected to the sixth output of the encoder/decoder, having a second input electrically connected to the fifth output of the encoder/decoder, having a third input, and having first and second outputs;

a second bus driver having a first input electrically connected to the fifth output of the encoder/decoder, having a second input electrically connected to the sixth output of the encoder/decoder, having a third input, and having first and second outputs;

a first bus receiver having first and second inputs, having a first output electrically connected to the first input of the input multiplexer, and having a second output electrically connected to the second input of the input multiplexer;

second bus receiver having first and second inputs, having a first output electrically connected to the third input of the input multiplexer, and having a second output electrically connected to the fourth input of the input multiplexer;

a first interface transformer having a first terminal electrically connected to the second output of the first bus driver and electrically connected to the first input of the first bus receiver, having a second terminal electrically connected to the first output of the first bus driver and electrically connected to the second input of the first bus receiver, and having third and fourth terminals; and a second interface transformer having a first terminal electrically connected to the first input of the second bus receiver and electrically connected to the first output of the second bus driver, having a second terminal electrically connected to the second input of the second bus receiver and electrically connected to the second output of the second bus driver, and having third and fourth terminals; and a system control logic having a first electrical connection to the first serial-in-parallel-out shift register, a second electrical connection to the first parallel-in-serial-out shift register, a third electrical connection to the encoder/decoder/interface, a fourth electrical connection to the second serial-in-parallel-out shift register, a fifth electrical connection to the first-in-first-out memory, a sixth electrical connection to the data multiplexer, a seventh electrical connection to the second parallel-in-serial-out shift register, and at least one input and at least one output.

* * * * *